R. M. CORL & H. F. HAGEMEYER.
GLASS ROD MACHINE AND PROCESS.
APPLICATION FILED FEB. 14, 1913.

1,298,463.

Patented Mar. 25, 1919.
7 SHEETS—SHEET 5.

UNITED STATES PATENT OFFICE.

ROBERT MACKEY CORL AND HENRY F. HAGEMEYER, OF TOLEDO, OHIO, ASSIGNORS, BY MESNE ASSIGNMENTS, TO JOHN N. WILLYS, OF TOLEDO, OHIO.

GLASS-ROD MACHINE AND PROCESS.

1,298,463.  Specification of Letters Patent.  Patented Mar. 25, 1919.

Application filed February 14, 1913. Serial No. 748,300.

*To all whom it may concern:*

Be it known that we, ROBERT M. CORL and HENRY F. HAGEMEYER, citizens of the United States, residing at Toledo, Lucas county, Ohio, have invented new and useful Glass-Rod Machines and Processes, of which the following is a specification.

This invention relates to the production of glass rods and the mechanism therefor.

This invention has utility when embodied in hollow rod or tube mills, especially for continuous production.

Referring to the drawings.

The mill or machine is actuated by the prime mover or motor 1 (Figs. 1, 2) having the driving shaft 2 having the worm 3 thereon in mesh with the worm wheel 4 on the transversely extending shaft 5 carrying the sprocket wheel 6 about which extends the sprocket chain 7 to the sprocket wheel 8 on the shaft 9. The shaft 9 has the pair of sprocket wheels 10 for the endless conveyer sprocket chain 11 passing about the sprocket wheels 12 on the shaft 13 parallel to the shaft 9. These shafts 9, 13, are mounted in the brackets 14 carried by the I-beam supporting frame 15 (Fig. 1) which may be sustained in an inclined position by the uprights 16 to effect or assist in the progress or actuation of the glass through the mill.

Figures 3, 4, 5:
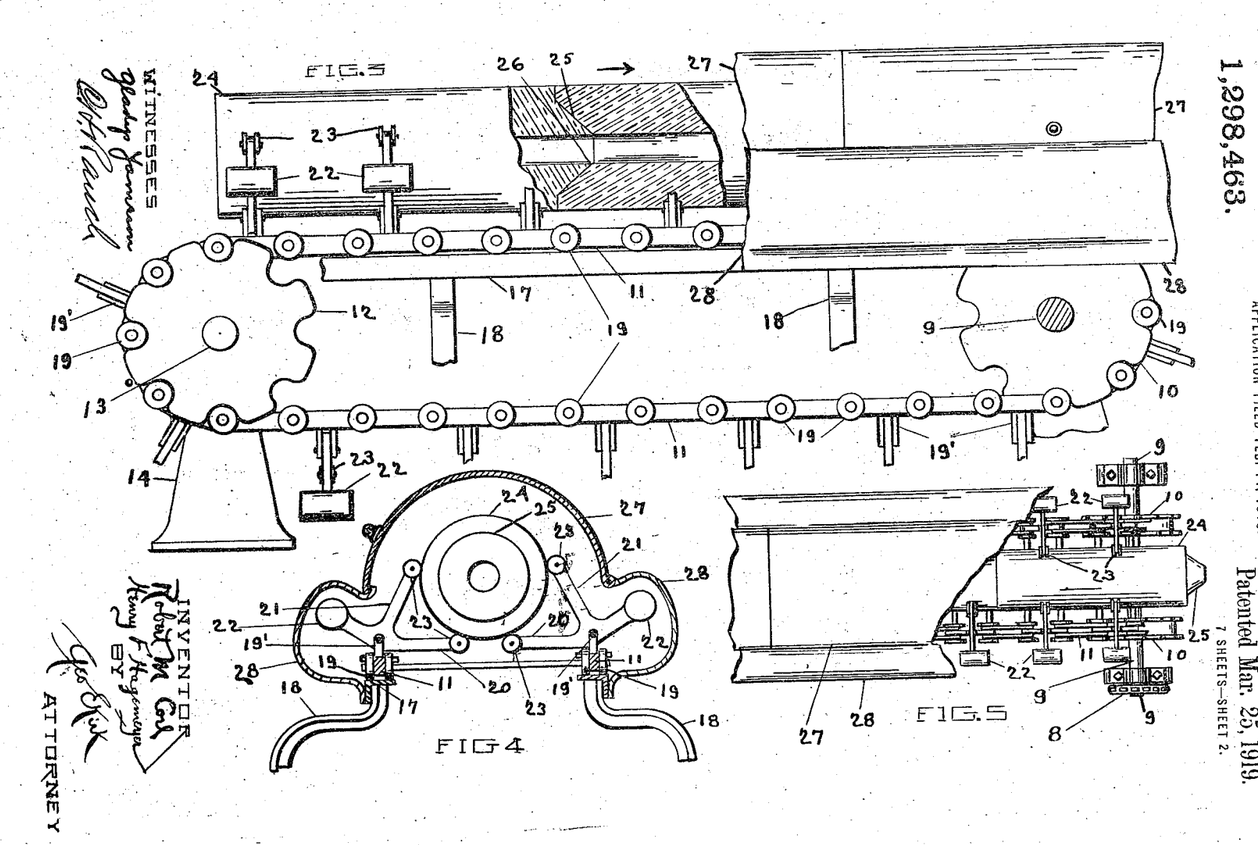
Fig. 3 is a fragmentary side elevation, on an enlarged scale of the charging mechanism or glass mass progressing means.
Fig. 4 is a cross section of the charging mechanism of Fig. 3.
Fig. 5 is a fragmentary plan view, on a smaller scale, of the charging mechanism of Fig. 3.

The ways 17 carried by the brackets 18 provide paths for the rollers 19 of the sprocket chains 11, allowing free travel, even when loaded, and maintaining such travel against sag (Figs. 3, 4, 5). Disposed along the chains 11 are brackets 19' pivotally carrying members having the arms 20, 21, and counterweighting arms 22. The arms 20, 21, carry antifriction rollers 23.

These rockable arms are disposed in opposing relation, and when not loaded, extend upwardly, so that a charge, as a mass or ingot of glass may be placed thereon. The weight of this charge overcomes the action of the counterweights 22, then by the gravity of the charge, it is gripped or engaged for progressing with this endless conveyer. The rollers 23 permit the charge to assume rotation while it is gripped and compelled to move along.

These charges of glass may advantageously be of heated or hot masses, heated after being formed or cast, or maintained in a heated state or taken direct from forming. In adapting to the mill as shown, it is desirable that the charge have form. However, in continuous mill operation, it is in order to successively charge the ingots or masses. These hot glass masses 24 may have projecting portions 25 to interfit with the recesses 26 in the next adjacent ingot 24 into position as to which it is forced by the endless conveyer or pusher device. With these ingots 24 cool enough to have definite form and with their surfaces approaching plasticity, this pushing together of the successive ingots 24, may effect a sealing or welding therebetween to further assist in having the mass a unit for handling and treatment in the machine.

As the successive charges 24 are introduced, the doors or lids 27 of the housing 28 may be closed to more effectively retain the heat of the charge in its movement through the mill.

On the shaft 2 of the motor 1 (Figs. 1, 2) is the sprocket wheel 29 having the sprocket chain 30 driving at a reduced speed the sprocket wheel 31 on the shaft 32 carried by the brackets 33 centrally of the frame 15.

Figures 6, 7:
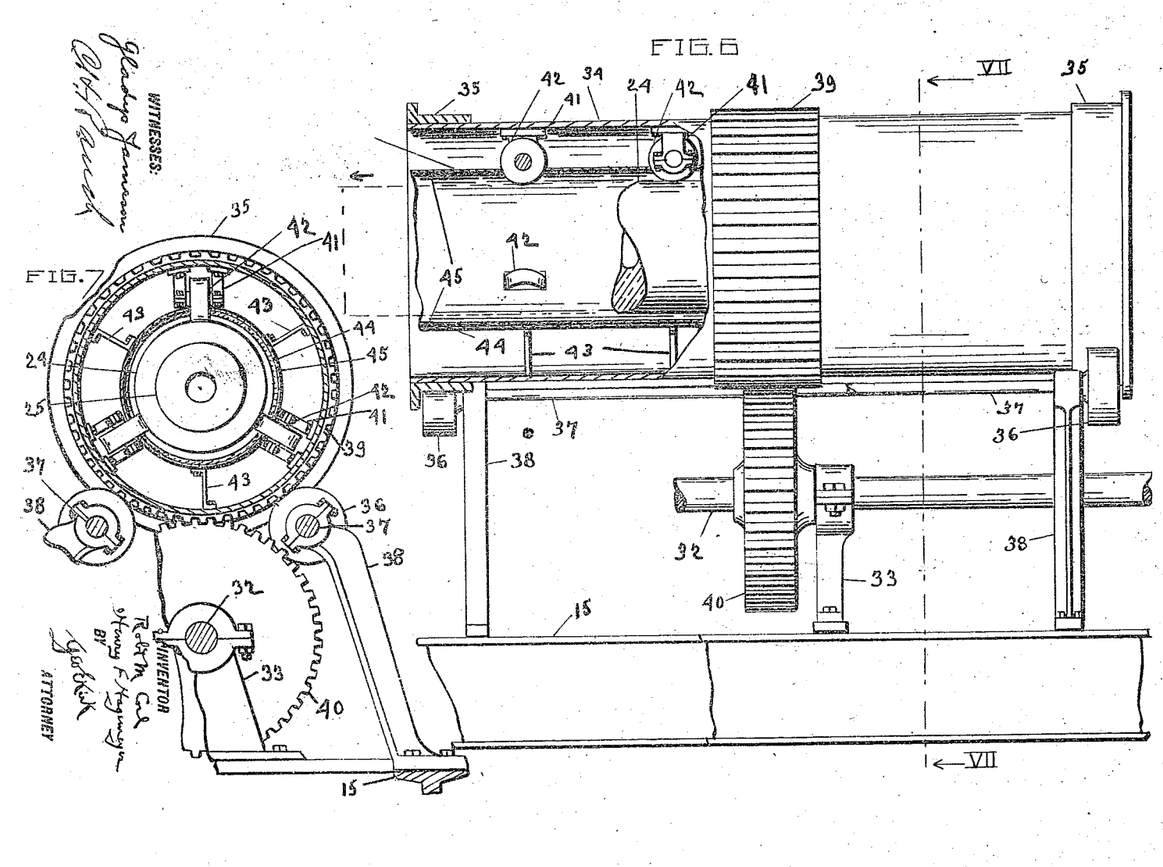
Fig. 6 is a side elevation, with parts broken away, of a glass mass rotating device for receiving the charged mass from the mechanism of Fig. 3.
Fig. 7 is a view on the line VII—VII, Fig. 6, looking in the direction of the arrows, and with parts broken away.

Following the housing 28, the mass of glass is delivered to the drum 34 (Figs. 6, 7), having near each end thereof a flanged track 35 with which coact the sustaining rollers 36 on the parallel shafts 37 mounted in the brackets 38. The drum 34 carries the annular set of gear teeth 39 in mesh with the gear 40 on the shaft 32 to rotate the drum 34. Brackets 41 on the inside of the drum 34 carry rollers 42 to coact with the glass mass to sustain the glass, and allow of its free progress, as well as cause rotation thereof. Brackets 43 maintain an inner shell 44 in position so that the rollers 42 extend therethrough, and the inner lining 45 for this shell 44 of a non-conducting substance serves to keep the heat of the charge from objectionally affecting the bearings for the rollers 42.

The shell or heat conducting housing 44 has the flare end 46 to receive the hot gases from the flowing device 47 and conduct them along the approaching mass of glass to warm and have the mass fully preheated when it enters the flowing device. These waste heat gases from the flowing device, not only pass through the shell 44, but are conducted along through the housing 28 (Figs. 8, 9, 10, 11).

Figures 8, 9, 10, 11:
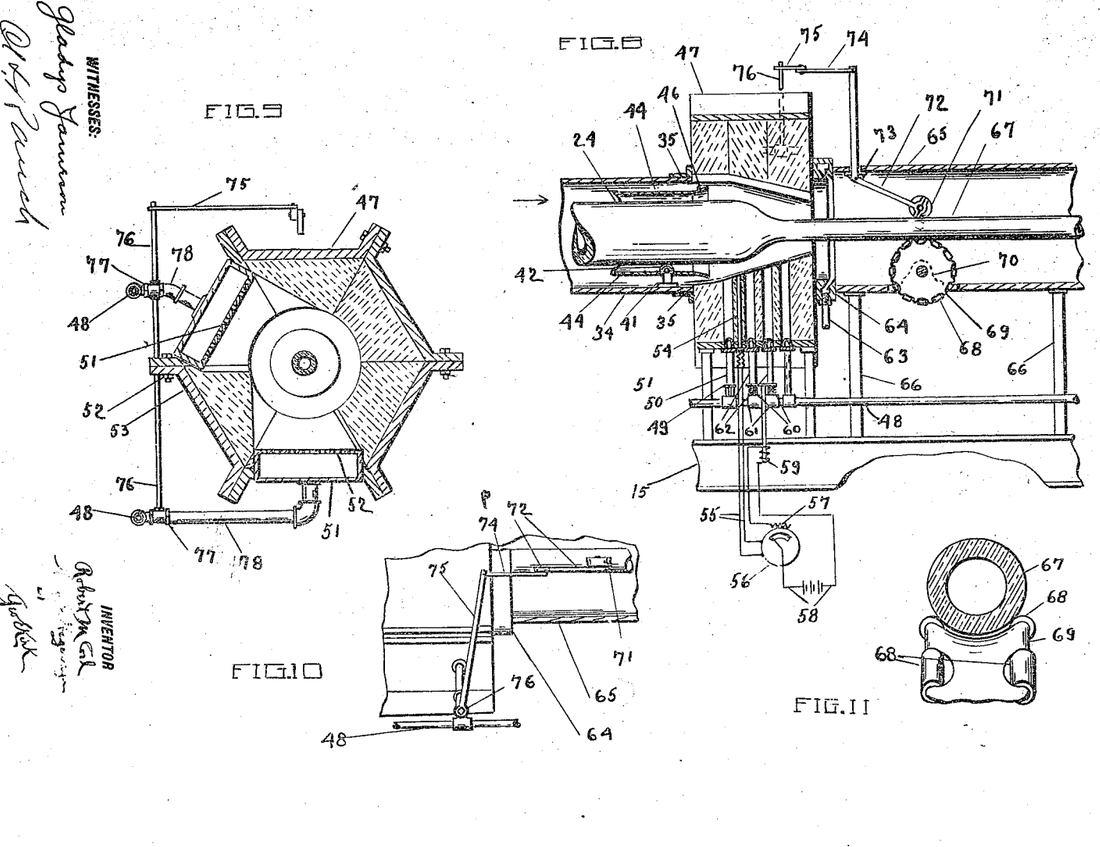
Fig. 8 is a longitudinal section through the heater or glass flowing control means to which the mass of glass is delivered after passing the rotating device of Fig. 6.
Fig. 9 is a transverse section of the heater of Fig. 8.
Fig. 10 is a fragmentary plan view of a controller or automatic heater adjusting means.
Fig. 11 is a fragmentary view of the rod support following the heater.

The pair of fuel supply mains 48 are provided with manually controlled valves 49 in the branches 50 extending to the burners 51 having the series of perforations 52 to supply a sheet or zone of intense heat in a blast tangentially of the oncoming mass of glass. The manual control of these burners may bring the mass of glass up to the flowing stage, or approximately thereto should the preheating and waste gases not be sufficient therefor. Furthermore, in starting the mill, this burner has utility, but may be entirely cut off in some instances of operation.

The pyrometer 54 has its leads 55 extend to the indicating instrument 56 controlling resistance 57 in the circuit 58 to actuate the core 59 against the resistance of the spring 60 and thereby effect delicate adjustment automatically of the valves 61 in the branches 62 from the fuel supply mains 48 to the burners 51 following the burners 51 on the branches 50. These automatically controlled burners or heaters, may be set for the character of glass being treated to cause the desired melting rate according to the rate of progress of the mass relatively to the heater and according to the size of the finished product to be manufactured. These burners, or in some instances one of them may answer, may cause the melting off of the mass of glass from its rotating supply. The glass as thus handled is permitted to take its new form freely to the elimination of cording or introduction of internal strains in reshaping, making an article which may be true in its form and so resistant in its structure as not to require even annealing. The article is accordingly high grade in all respects to answer the demands upon such ware.

Following the flowing device 47 carrying the fire resistant material in operation approaching incandescent heat, with the hot gases passing back along the oncoming ware, is the air blast supply line 63 to the ring 64 directing a cooling medium away from the restricted outlet of the heater to effect a current away from the heater through the fixed drum 65 carried by the brackets 66. Through this drum housing 65 passes axially of said drum, the product 67, in this instance a tube. The supplied mass glass 24 has an opening therethrough, which in usual operation is a little in excess of the opening through the product.

Supporting this product 67 as it is early cooled to maintain its form, are the rollers 68 carried by the wheel 69 mounted in the bracket 70 carried by the drum 65. The wheel 69 allows the product to progress freely, while the rollers 68 permit the product to participate in the rotation of the glass.

To check up for the production of a uniform gage product, an automatic control may be provided. Coacting with the product 67 and opposing the wheel 69 is the pilot roller 71 carried by the angle lever 72 having its fulcrum carried by the bracket 73 mounted in the drum 65. The opposite arm of the lever 72 from that carrying the roller 71, has the link 74 extending to the arm 75 on the valve rod 76 controlling the two valves 77 in the branches 78 from the fuel supply mains 48, to effect automatic control of a set of burners 51. In some instances the heat or pyrometer control alone need not be supplemented by this pilot control, while in other instances this pilot control may be ample. The nature of the glass to be flowed, as well as features of mass travel and product size, enter into the action of the heater. Furthermore, the intensity of the zone action of each burner may be widely varied, not only by the blast pressure but as supplemented by valve opening and richness of the fuel. Therefore, a single burner or burner zone may be effective in some manufacturing or uses of this mill.

Figures 12, 13, 14:
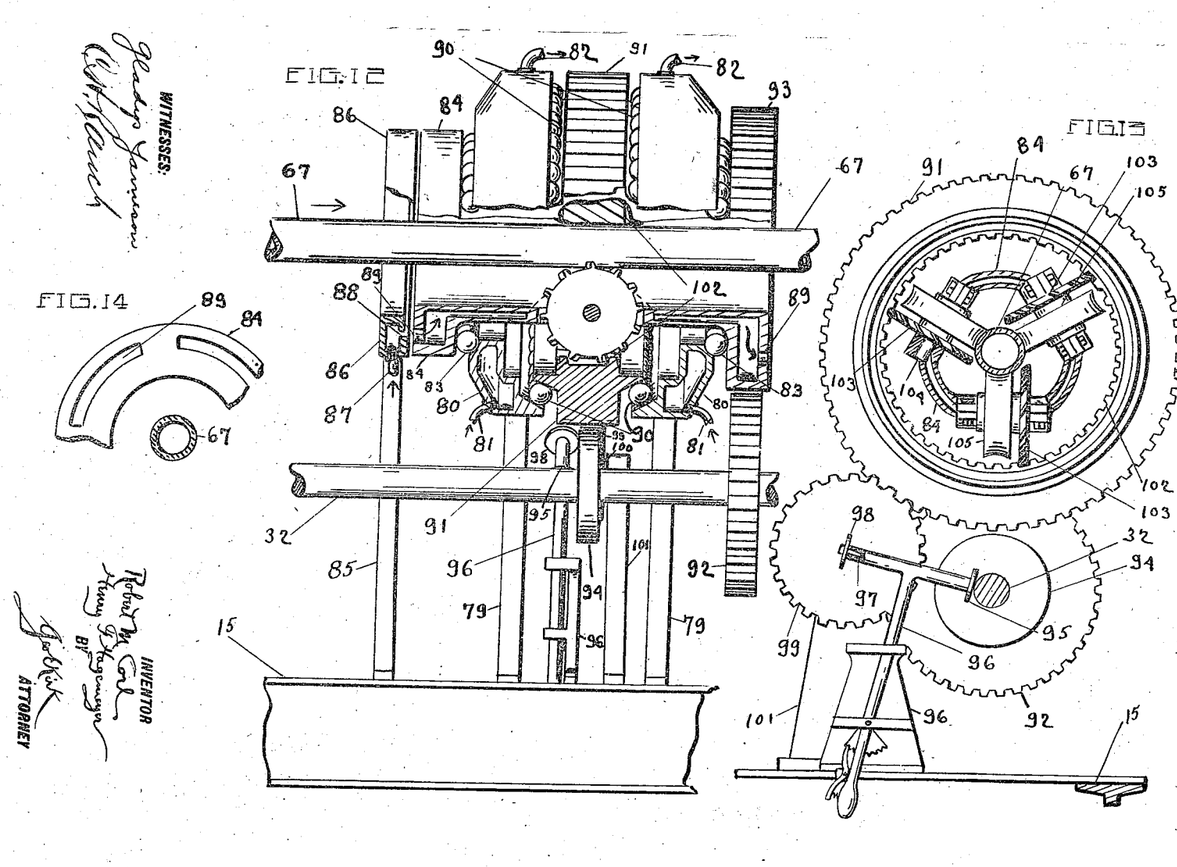
Fig. 12 is a side elevation, with parts broken away, of a planetary rotating and progressing mechanism for the glass.
Fig. 13 is a transverse section of the device of Fig. 12, showing the progress adjusting device.
Fig. 14 is a fragmentary end elevation of the air cooling inlets for the mechanism of Fig. 12.

As the flowing glass has little cohesion, in instances where the supplied mass is rotated, it is well to make provision for rotation of the product to keep torsion out of the soft product, eliminate irregularities, and thereby assist in the manufacture of a high grade article. To provide for carrying, progress and rotation, mechanism is introduced following the cooler adjacent the heater. Mounted on the frame 15 are the brackets 79 carrying the ring chambers 80 providing ball races. A cooling medium, as water, may be supplied from the pipes 81 to the chambers 80 for circulation therethrough to cool said chambers and then be discharged through the pipes 82 (Figs. 12, 13, 14).

The outer ends of this pair of chambers 80 provide races for the sets of balls 83 forming antifriction mounting for the inner chambered drum 84. Brackets 85 position the ring 86 adjacent the product entering end of the chambered drum 84. Pipe 87 supplies air under pressure to this hollow ring 86 which has opening 88 in registry with the openings 89 of the drum 84, thereby supplying to this drum 84 a cooling blast which may escape from similar openings 89 at the opposite end. This air cooling device serves to keep down the temperature of the bearings outside this drum 84 and render operation more easy thereby.

Between the rings 80 and outside the drum 84 the two sets of balls 90 form an antifriction support for the ring member 91 having on its outer surface a set of teeth. The driving shaft 32 has the gear wheel 92 in mesh with the gear teeth 93 of the drum 84 to rotate this drum. The driving shaft 32 also carries the friction disk 94 with which may coact the friction wheel 95 carried by the adjustable bracket 96 movable to shift the wheel 95 radially of the disk 94 and thereby vary the speed of the shaft 97 on which the wheel 95 is mounted. This shaft 97 carries on its end opposite the wheel 95, the friction wheel 98 contacting the friction face of the gear wheel 99 in mesh with the gear teeth of the ring member 91. This wheel 99 is mounted on the short shaft 100 in the bracket 101.

The ring 91 has on its inner side the spiral gear teeth 102 in mesh with the spiral gears 103 on the shafts 104 carried by the drum 84. On each of these shafts 104 is a roller 105 carrying the glass rod 67. In the planetary travel of these rod supporting rollers 105, they impart to the rod 67 a rotation in synchronism with the rotation given the mass glass by the drum 34. The progress of the flowed glass is necessarily at a greater speed than that of the supplied mass glass and may vary according to the size and gage of the output. To permit of ready adjustment to these conditions the friction drive controlled readily by shifting of the bracket 96, effects such progress or feeding rate by rotating the rollers 105 as may be found necessary in the particular instance.

Figures 15, 16, 17:
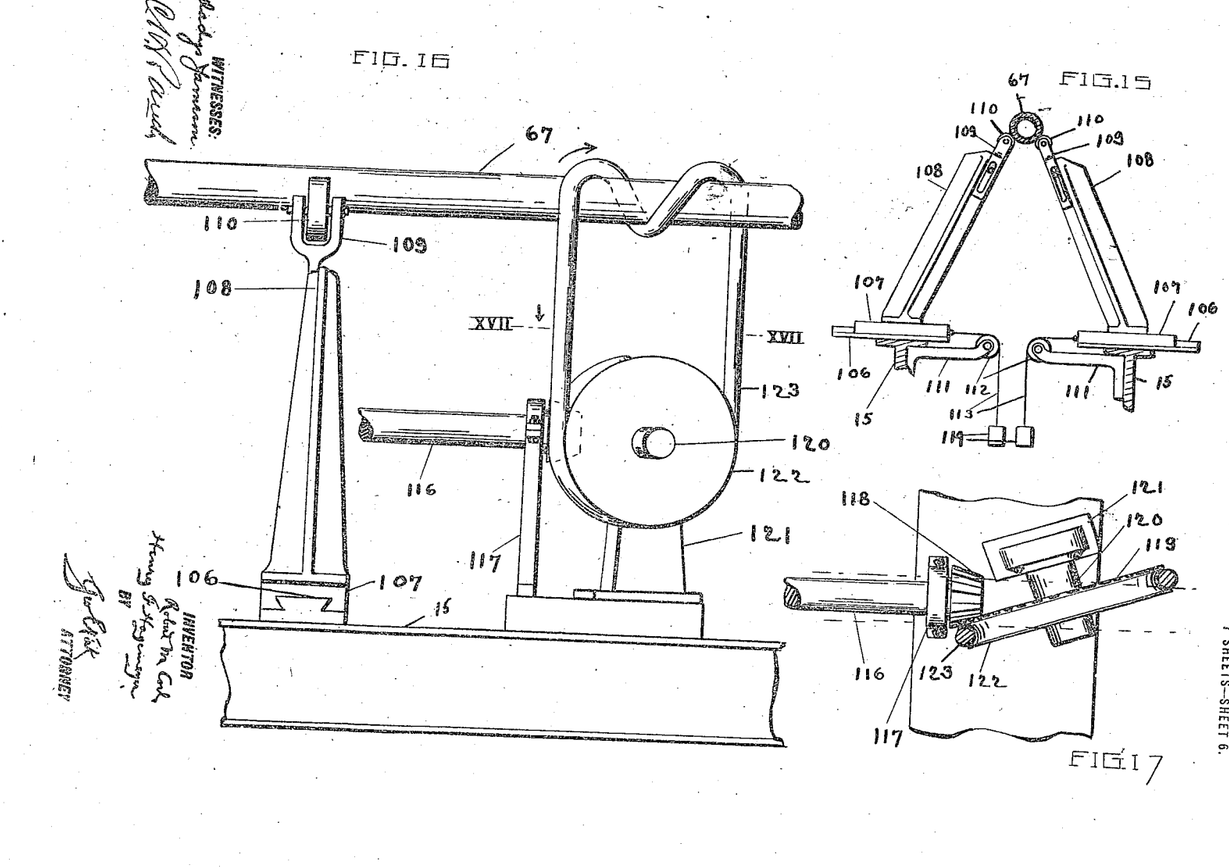
Fig. 15 is a view on the line XV—XV, Fig. 1, looking in the direction of the arrow, with parts broken away, showing rod supporting brackets, or carriers.
Fig. 16 is a side elevation of a supplementary rotating and progressing drive device for the glass, following the device of Fig. 12.
Fig. 17 is a view on the line XVII—XVII, Fig. 16, looking in the direction of the arrow.

To sustain the rotating and progressing glass in its axial travel during cooling or various treatments in the mill, sustaining devices are provided (Figs. 15, 16). Mounted transversely of the frame 15 are dove tails 106 with which coact the shoes 107 to guide in reciprocating the upstanding brackets 108 having longitudinally adjustable extensions 109 carrying the tube contacting rollers 110. Adjacent the dove tails 106 are the brackets 111 carrying rollers 112 over which may pass the lines 113 to the counterweights 114 serving normally to maintain the tube sustaining rollers 110 in proper carrying position. These rod sustaining devices are disposed in pairs.

In the matter of rotating the glass, the provision of mechanisms therefor may be variously positioned. With a mill of considerable length, it may be desirable to follow up the tube rotating device of Fig. 12, with additional rotating and even progressing mechanism in order to eliminate all strains from the cooling ware. Shaft coupling 115 may connect the shaft 116 to the driving shaft 32. This shaft 116 is mounted in the bracket 117. On the end of the shaft 116 is the bevel pinion 118 in mesh with the gear 119 on the stub shaft 120 mounted in the bracket 121 carried by the frame 15. This bevel gear 119 has a grooved periphery 122 for the belt 123 having a second loop or progressive wrap about the rod 67, to give this cooling glass rotation and feeding action simultaneously. When cooled to this stage the continually changing belt may contact direct to effect this driving.

Figures 18, 19, 20:
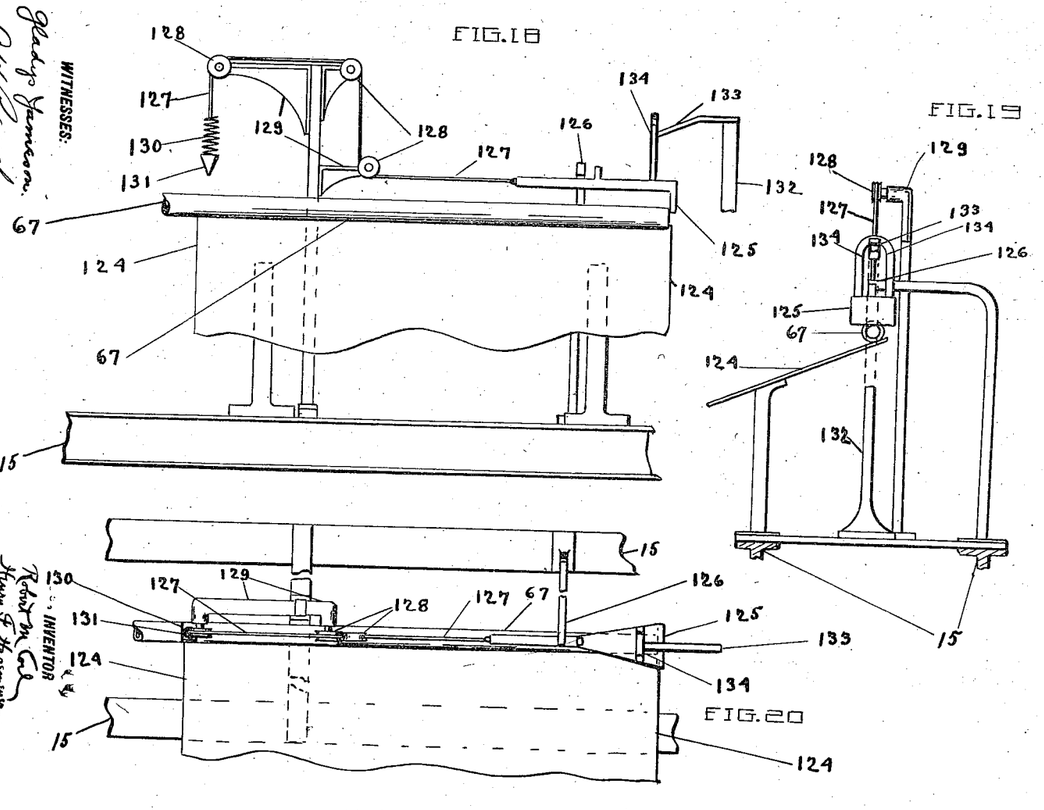
Fig. 18 is a side elevation of a cutting device for automatically severing the product into the desired lengths.
Fig. 19 is an end elevation of the cutting device of Fig. 18.
Fig. 20 is a fragmentary plan view of the cutting device of Fig. 18.

The baiting and feeding through of the first lengths to effect starting of the mill introduces considerable cullet and expense as in all intermittent work. However, for continuous operation, a high grade product with practical elimination of cullet is possible. In the delivery of the finished product, it is desirable to care for the output by severing into such stock or other lengths as may be needed. The sufficiently cooled rod 67 passes over the chute 124 (Figs. 18, 19, 20) and engages the member 125 to push it away from its return limit stop 126. Extending to the member 125 is the line 127 passing about the pulleys 128 carried by the brackets 129. To return the member to its limit stop 126, the line 127 has on its opposite end the spring 130 connected to the weight 131. With the member 125 against the stop 126, the pointed weight 131 just clears the rotating rod 67. Beyond the limit of travel for rod lengths, is disposed the upright 132 having the cam 133 extending to engage the opening 134 in the upstanding arm of the member 125, causing the member 125 to be lifted free of the rod at a definite point in its travel. When thus released, the weight 131 causes the member 125 to return to its stop 126, and the momentum of the weight in this sudden return allows the spring to give some extension to strike the still warm rotating tube 67 and thereby fracture off a definite length of stock to be gathered on the chute 124.

With glass supplied to the mill as herein disclosed, the successive treatments of the various mechanisms, adjusted to the character of material and output, as well as all conditions, bring about automatically the production of high grade solid rod or tubing most efficiently.

Figures 1, 2:
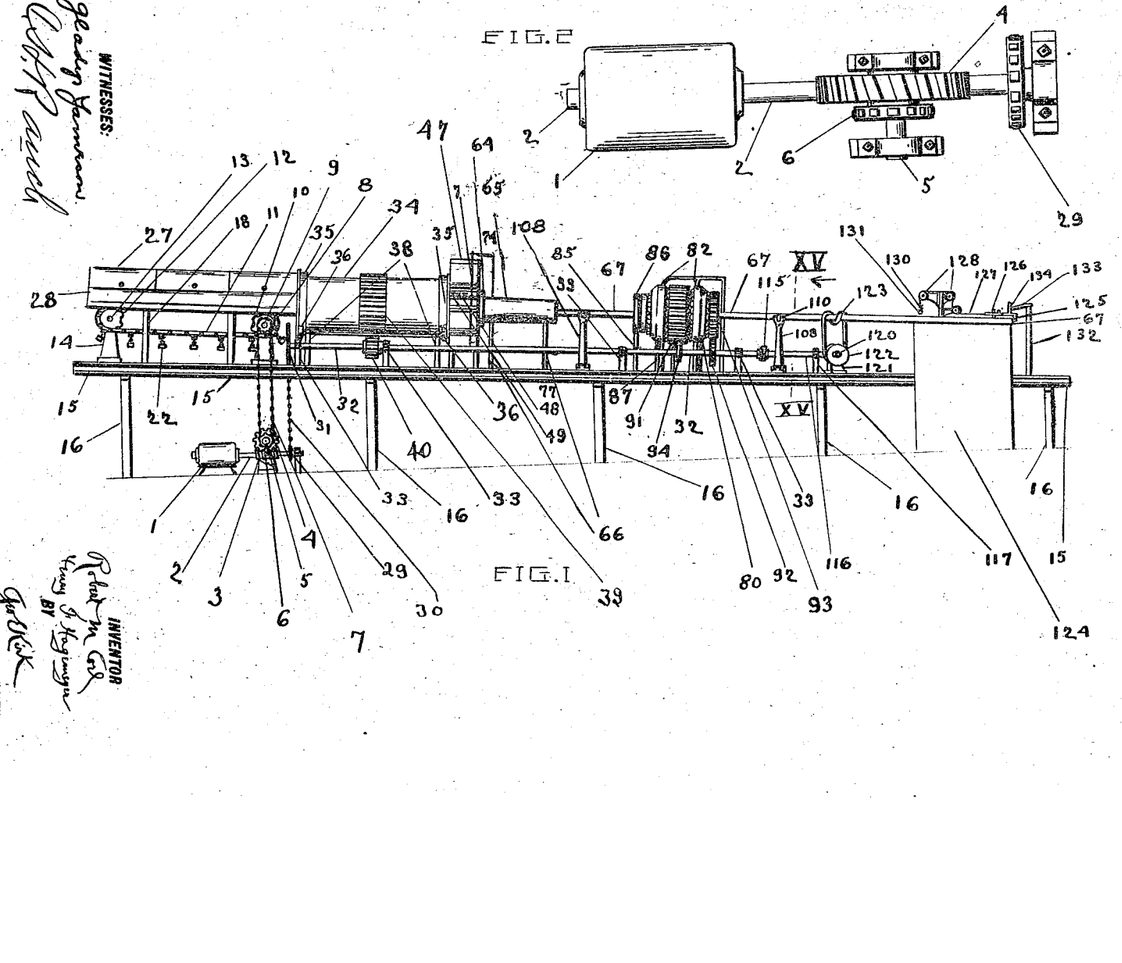
Figure 1 is a side elevation of an embodiment of the invention in a continuous hollow rod or tube mill.
Fig. 2 is a plan view of the driving mechanism for the glass flowing machine or tube mill of Fig. 1.

By inclining the frame 15, a forward or progressing action is imparted to the glass being treated, and at some rates of rotation or operation may be sufficient progressing action.

Throughout the specification and claims the word rod, referring to the product of the machines, has been used as meaning and including not only a solid rod but also a hollow rod or tube.

What is claimed and it is desired to secure by Letters Patent is:

1. The method of working glass comprising the forming of ingots; the joining of said ingots end to end to form a continuous charge; continuously advancing said charge; heating the forward portion of the charge to render the same plastic; continuously drawing from said plastic portion of the charge; and automatically severing the finished product into predetermined lengths.

2. The method of working glass comprising the forming or ingots; joining said ingots end to end to form a continuous charge; continuously advancing said charge; heating the forward portion of the charge to render the same plastic; and continuously drawing from said plastic portion of the charge.

3. The method of working glass comprising the forming of ingots; joining said ingots end to end to form a continuous charge of glass; heating the forward portion of said charge; and continuously drawing from the forward portion of said charge.

4. The method of working glass comprising the forming of ingots of suitable size and shape from a molten mass of glass; cooling said ingots sufficiently so that they will retain their form; joining said ingots to form a continuous charge of glass; heating the forward portion of said charge and continuously drawing from the forward portion of said charge.

5. A glass working machine comprising the combination of conveying mechanism for continuously advancing a charge of glass at a temperature below the fusing point; means for rotating said charge as it is advanced; a plurality of burners disposed to heat the forward portion of the charge to render it plastic; a burner regulating means controlled by the size of the product; means for advancing the product; means for rotating the product in synchronism with the charge; and automatic means for severing the product into predetermined lengths.

6. A glass rod machine comprising the combination of conveying mechanism for continuously advancing a charge of glass at a temperature below the fusing point; means for rotating said charge as it is advanced; a plurality of burners disposed to heat the forward portion of said charge to render it plastic and form a rod therefrom; burner regulating means controlled by the size of the rod; conveying means for advancing said rod; and means for rotating the rod in synchronism with the charge.

7. A glass rod machine comprising the combination of conveying mechanism for continuously advancing a charge of glass at a temperature below the fusing point; means for rotating said charge as it is advanced; a plurality of burners disposed to heat the forward portion of said charge to render it plastic and form a rod therefrom; conveying means for advancing and drawing the rod; and means for rotating the rod in synchronism with the charge.

8. A glass rod machine comprising the combination of conveyer mechanism for continuously advancing a charge of glass at a temperature below the fusing point; means for rotating the advancing charge; means for heating the forward portion of said charge to render it plastic; and means for continuously drawing a rod therefrom comprising means for advancing said rod at a rate proportional to the rate of advance of the charge and means for rotating the rod in synchronism with the charge.

9. A glass rod machine comprising the combination of an endless conveyer for continuously advancing a charge of glass; means for driving said conveyer; supporting members pivotally mounted on said conveyer and each comprising a pair of radiating arms, rollers mounted at the end of each arm and adapted to receive and rotatably support a charge of glass and a counterweighting arm; an outer casing; an inner casing carried thereby; rollers carried by the outer casing and projecting into said inner casing whereby the advancing charge of glass may be supported within said inner casing for longitudinal movement; means for rotating said casings; means for heating the forward portion of the charge to render it plastic; and means for continuously drawing a rod therefrom.

10. A glass rod machine comprising the combination of an endless conveyer chain for continuously advancing a charge of glass at a temperature below the fusing point; means for driving said conveyer; an outer casing; an inner casing carried thereby; rollers carried by said outer casing and projecting into the inner casing whereby the advancing charge of glass will be supported within said inner casing for longitudinal movement; means for rotating said casings; means for heating the forward portion of the charge to render it plastic; and means for continuously drawing a rod therefrom.

11. A glass rod machine comprising the combination of conveyer mechanism for continuously advancing a charge of glass at a temperature below the fusing point; a casing; means for supporting the advancing charge therein; means for rotating said casing; means for heating the forward portion of the charge to render it plastic; and means for continuously drawing a rod therefrom.

12. A glass rod machine comprising the combination of a casing; means for supporting and advancing a charge of glass therein; means for rotating said casing with the charge of glass within and means for moving the glass forward relative to said casing at a temperature below the fusing point; means for heating the forward portion of the charge to render it plastic; and means for continuously drawing a rod therefrom.

13. A glass rod machine comprising the combination of conveyer mechanism for continuously advancing a charge of glass; a burner; means for continuously drawing a rod from said charge; a supporting roller for said rod; a suitably fulcrumed lever; a roller carried by said lever and engaging said rod opposite the supporting roller; and connections between said lever and the burner for controlling the latter.

14. A glass rod machine comprising the combination of conveyer mechanism for continuously advancing a charge of glass; a burner; means for continuously drawing a rod from said charge; and means for regulating the burner controlled by the size of the rod.

15. A glass rod machine comprising the combination of conveyer mechanism for continuously advancing a charge of glass; means for rotating said advancing charge; means for continuously drawing a rod therefrom; and means for rotating and advancing said rod comprising a ring mounted coaxially with the rod, means for rotating said ring in synchronism with the charge, a plurality of rod-engaging rollers carried by said ring with their axes in a plane at right angles to the rod, a driving ring, driving connections between said ring and said rollers, and means for driving said driving ring adjustable to vary the speed thereof.

16. A glass rod machine comprising the combination of conveyer mechanism for continuously advancing a charge of glass; means for rotating said advancing charge; means for continuously drawing a rod therefrom; means for rotating the rod in synchronism with the charge; and means for advancing the rod adjustable to vary the speed thereof.

17. In a glass rod machine the combination of means for drawing a rod; means for rotating said rod; and a support for said rod comprising a base, a pair of slides movable transversely of the base, upwardly inclined converging arms carried by said slides, rollers adapted to engage the rod and carried by the upper ends of said arms and automatic means drawing said slides toward each other.

18. In a glass rod machine the combination of means for drawing a rod; means for rotating said rod; a pair of upwardly inclined arms converging toward each other and mounted for movement in a plane transverse to the rod; rollers mounted on the upper ends of said arms and adapted to engage the rod; and automatic means drawing said arms toward each other.

In testimony whereof we affix our signatures in the presence of two witnesses.

ROBERT MACKEY CORL.
HENRY F. HAGEMEYER.

Witnesses:
Geo. E. Kirk,
Roy E. French.